Patented Dec. 7, 1937

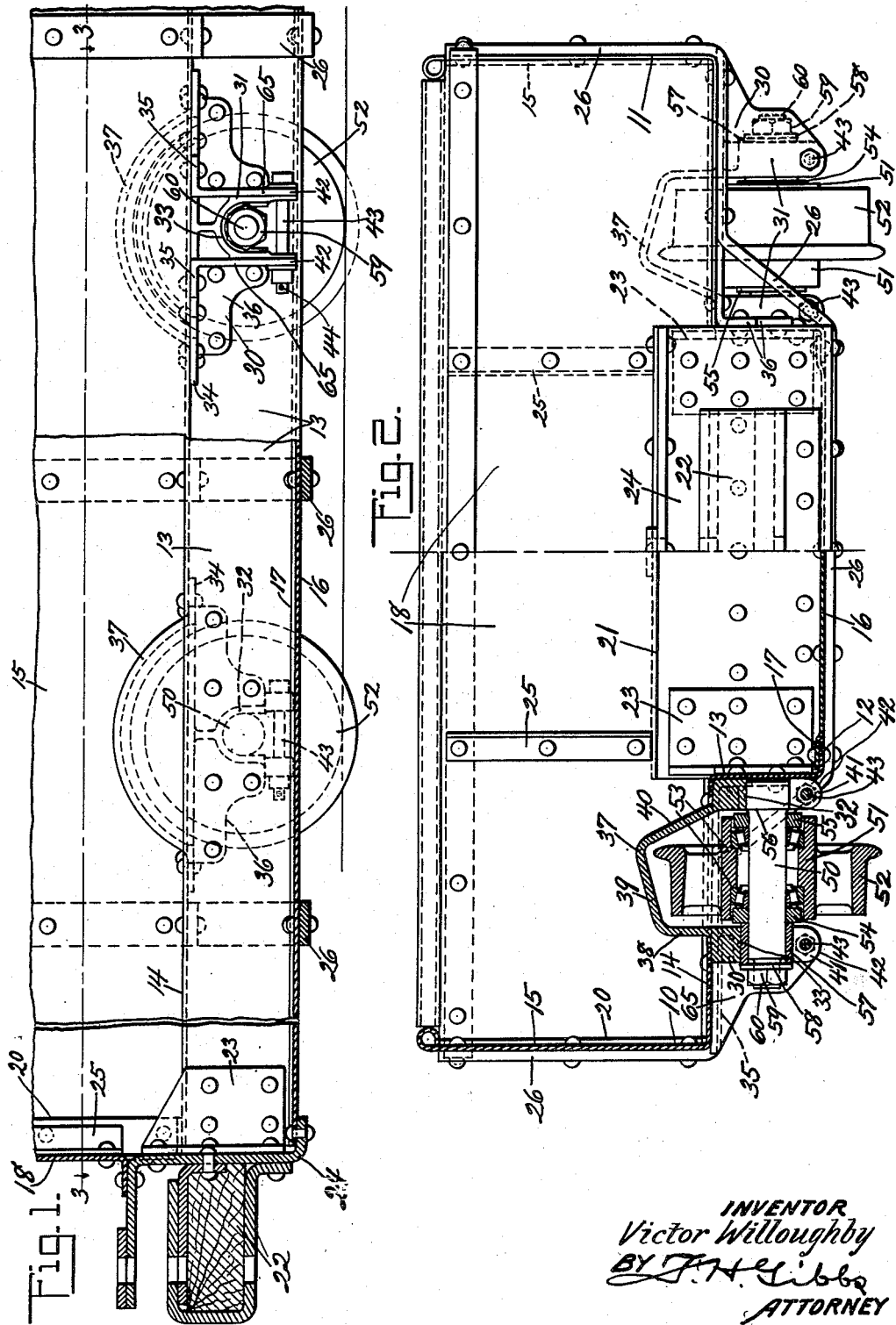

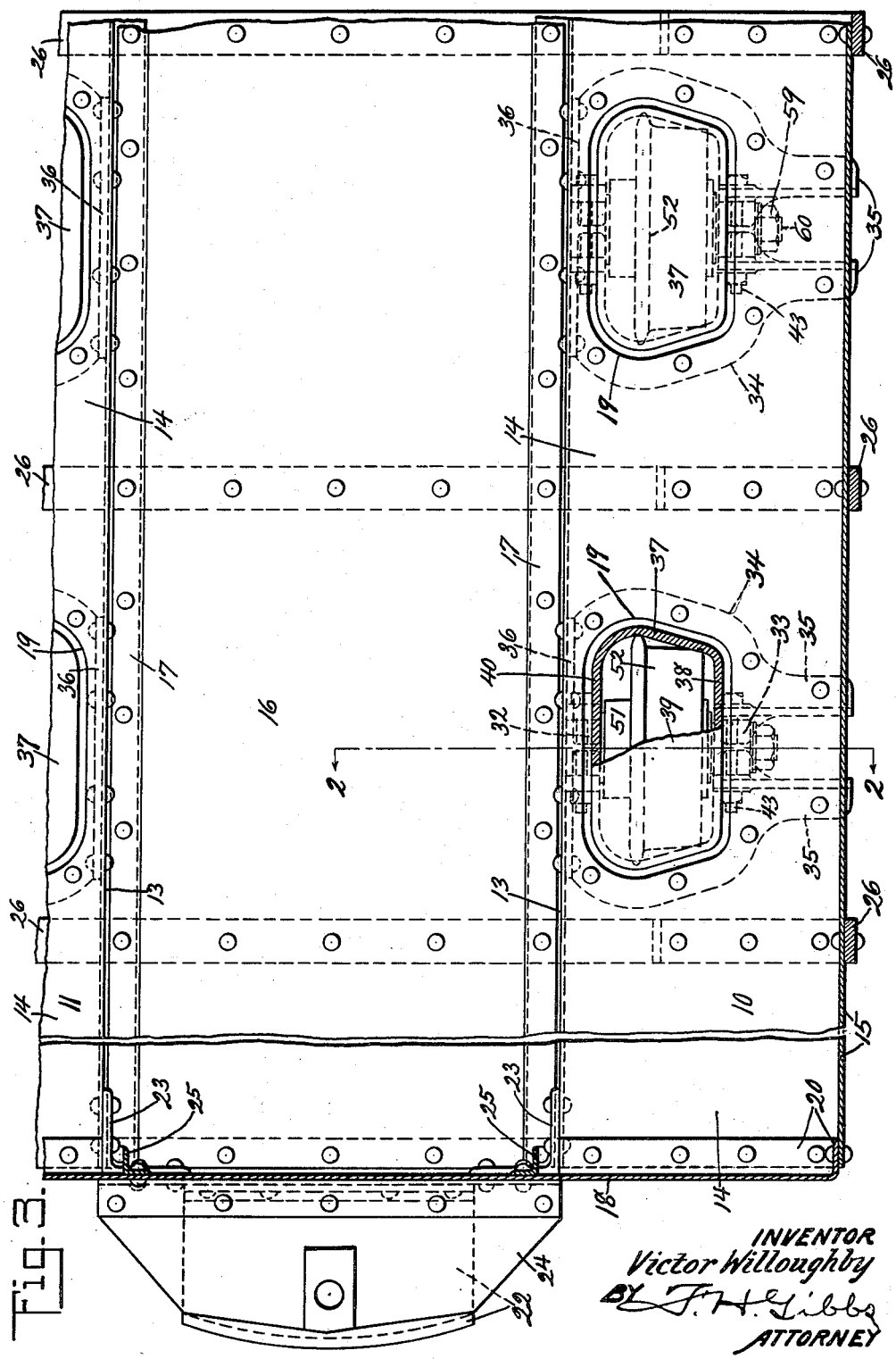

2,101,208

UNITED STATES PATENT OFFICE

2,101,208

MINE CAR

Victor Willoughby, Ridgewood, N. J., assignor to American Car and Foundry Company, New York, N. Y., a corporation of New Jersey Application December 1, 1931, Serial No. 578,272

5 Claims. (Cl. 105—364)

This invention relates to mine cars and with regard to certain more specific features thereof to large capacity, low lading-level mine cars.

The invention has for one of its objects to provide by relatively inexpensive methods of manufacture and with low material cost an extremely sturdy mine car of the above mentioned type.

Another object of the invention is to provide a mine car body substantially of sheet metal worked to shape by straight line bending operations and devoid of any of the usual longitudinal beams or sills. The shell body so produced is reinforced by the incorporation therewith of a plurality of wheel frames so arranged and secured to the shell that a light weight car of exceptional resistance to lading and operation strains is produced.

Another object is to provide a car of the type referred to in which repairs and replacements can be effected conveniently and at small expense. In addition to the elimination of the conventional longitudinal I-beams, channels and similar pieces, the invention in certain of its aspects involves the elimination of trucks upon which in prior constructions the car bodies have been mounted. By the present construction in its preferred form the shell body is provided at suitably spaced points with axle receiving means or pedestals each of which is adapted for the introduction of a wheeled stub-axle and means are provided whereby the wheeled axle may be introduced or removed as a unit without disturbing the bearing adjustment or in any way disassembling the combined axle, wheel and anti-friction bearings.

Still another object of the invention lies in the method of constructing and assembling a mine car, which method comprises the steps of making a shell body complete, involving the assembly of sheet metal parts to form a lading body having a central sub axle-plane flooring, vertical risers therefrom connecting with side flooring and side walls rising from the outer side flooring. This body may be suitably completed with end walls or lift end gates and reinforced by a plurality of spaced transversely extending straps. Suitable wheel receiving apertures may be formed in the side flooring portions. This body is then assembled with individual axle receiving means, the latter comprising integral wheel frames including wheel hoods over said apertures which complete the side flooring and serve as pedestals for the axles.

The pedestals, formed at their lower ends with downwardly opening recesses, are adapted for the reception of wheeled axle assemblies which may be quickly and conveniently applied and maintained in position by pins passing through the lower portions of the pedestals. This construction makes for the greatest ease of assembly and disassembly of the parts inasmuch as the shell body is constructed first as a unit after which the wheel frames are attached thereto and secured to the side flooring of the body and subsequently the wheeled axle units are applied. Any of the axles or any of the wheel frames may be removed for repairs or replacements without disturbing the assembly of any of the other axles or wheel frames.

Other objects will be in part obvious and in part pointed out particularly in the following description of a preferred form of the invention.

The invention accordingly consists of the various features of construction, combinations of elements and arrangements of parts which will be exemplified by the construction hereinafter described and illustrated in the accompanying drawings, and the scope of the application of which will be indicated in the appended claims.

In the drawings:

Figure 1 is a fragmentary view partly in side elevation and partly in longitudinal central section of the improved mine car.

Fig. 2 is a view of the same partly in end elevation and partly in section on the line 2—2, Fig. 3, and Fig. 3 is a sectional view on the line 3—3 of Fig. 1.

The car of the present invention includes a body formed of sheet metal and comprises two main oppositely arranged side sections 10 and 11. Each of these sections, as best illustrated in Fig. 2, is shaped by straight line bending operations with an inner supporting lip 12, a vertical riser 13 constituting a side sill, a horizontal side flooring 14 and a vertical side wall 15. A sub axle-plane central flooring 16 extends between the risers 13 and is slightly offset along its longitudinal margins as indicated at 17 to overlie the supporting lips 12 of the risers and be riveted thereto. The risers 13 and the central flooring portion 16 constitute a depressed longitudinal central lading portion, the bottom of which is preferably substantially below the axle plane and close to the track level.

The side flooring 14 on opposite sides of the body is provided with wheel openings 19 for purposes which will be hereinafter set forth more in detail. Suitable end walls 18 are framed into the body as indicated in Fig. 3, preferably by inturned flanges 20 conformable to the inner periphery of the longitudinal shell formed by the assembly of the two main side sections and the central flooring. The flange 20 is riveted to the end portions of the side walls 15. The end walls are apertured at 21 allowing for the connection of suitable bumper mechanism 22, preferably of thicker metal than the end walls, with the body shell by means of angle brackets 23 riveted to transverse Z bars 24 of the bumper construction. The end walls are also provided with reinforcing angle members 25. To strengthen the body as so far constructed a series of spaced transverse straps 26 are riveted exteriorly around the body from the top of one side wall partially under the side flooring, dipping under the central flooring and proceeding in like manner to the top of the opposite side wall. Owing to the offsetting of the margin 17 of the central flooring 16 and the consequent flush bottom obtained with the supporting lips 12 no filler pieces are necessary between the central flooring and the straps.

The body as so far described is completely self-sustaining and may be handled for assembly with the axle receiving means. Each of the axle mountings is preferably in the form of a cast metal wheel frame 30 comprising a forked axle receiving means or pedestal 31 having inner and outer saddles 32 and 33, respectively. The wheel frame is also provided about midway of its height with a substantial attaching flange 34 running transversely around the upper part of the axle pedestal and terminating in ears or angular ribs 35 adapted to underlie the outer region of the side flooring and preferably extending to a point beneath the side walls 15. At right angles to this flange on the inner side of the wheel frame is a depending flange or ear 36 merging with the inner axle saddle 32. The wheel frame is also provided with an upwardly extending integral wheel hood 37 having the vertical wall 38, inclined top 39 and inclined inner wall 40, all of which walls curve suitably toward the front and rear of the wheel housings and merge eventually with the axle pedestal or the flange 34 so that the discharge of the lading will not be obstructed. The forks of the axle pedestal 30 are recessed upwardly from their lower ends as indicated at 41 constituting saddles for the reception of axles by straight line thrust from below. This provides spaced depending ears 42 on the wheel frame which are bored to receive detachable pins 43 held in place by cotter pins 44. The described wheel frame castings are incorporated with the body by insertion thereof from below the side flooring and projecting the hood portions thereof through the openings 19 to bring the flange 34 against the under face of the side flooring, thus substantially closing the openings in the car side floor. This locates the wheel frame so that the axle pedestal portion thereof is in the angle formed by the side flooring and associated vertical risers. The wheel frame is then riveted in this position by fairly closely spaced rivets through the flange 34 and the side flooring portions, and other rivets attach the flange 32 to the riser 13 if desired. The car body assembled with wheel frames is now ready for the reception of wheel and axle assemblies. These are first organized as units by the insertion of each stub axle 50 through a hub 51 of a flanged car wheel 52. Suitable anti-friction devices are arranged between the axle and the hub, these being preferably in the form of Timken roller bearings the outer races of which are positioned in shouldered portions 53 of the wheel hub and the inner races of which, carrying the rollers, are located between adjusting collars 54 and 55 on the axle. The collar 55 is preferably shrunk on the inner end of the axle at the shoulder 56. The outer collar is loose thereon and is inwardly movable by means of a sleeve 57 on the axle 50 acted upon by a washer 58 which is moved by a nut 59 in threaded engagement with a reduced end 60 of the axle. Tightening of the nut tightens the bearings and movement of the nut in the opposite direction allows the bearings to settle into loosened condition. These assemblies of wheels and axles are introduced to the wheel frames, the shouldered portion 56 at the inner end of the axle fitting into the inner forked end of the axle pedestal and the sleeve at the outer end of the axle fitting into the outer pedestal portion. Each axle is held against displacement by the introduction of pins 43 passed through the ears 42 and maintained in place by cotter pins 44. At the outer axle-end ribs 65 of the wheel frame extend outwardly and upwardly to the outer extremities of the flange 34 thus forming substantially right angular bracing elements or ribs having their upper surfaces co-planar with the remainder of the flange 34 along the ends of the wheel hood. The adjusting nut 59 is shielded in a pocket formed by the ribs 65 and the overhanging portion of the side flooring directly above. The nut is, nevertheless, easily accessible for adjustment purposes.

It will be seen that the wheel frames have multiple functions. Each serves with its substantial flange area to provide a strong transverse carrying member for the load. Combined with the sheet metal multi-angle side sections, the wheel frames serve to strengthen the body against both longitudinal, transverse and torsional strains. The fitting and securing of the wheel frames into the angles formed by the side flooring and risers further resists torsional strains on the body, particularly strengthening the depressed central lading portion against distortion. The wheel frames also serve to house the wheels, complete the side flooring, receive the axles and protect the adjusting nuts. The forming of the body side sections of continuous sheet metal angularly bent to provide the lips, risers, side flooring and side walls not only produces a body that is strongly resistant to longitudinal shocks and strains, but one which has a comparatively smooth interior devoid of any sills or flanges projecting into the lading zone so as to interfere with the discharge of the lading. Suitable clearance is provided for the projection of the wheel hoods through the side flooring allowing for some degree of manipulation of the parts in making the desired assembly. The clearance space, however, is backed up by the flange 34 of the wheel frame so that no leakage through the flooring can occur.

It is also a feature of the above construction that mine cars for different track gages may be easily produced using the standard main body sections 10 and 11, varying the width of the central flooring portions and end walls to suit. The wheel frames and wheeled axle assemblies may be standard for a wide variation in track gage.

The unit wheel frame comprising the opposed axle pedestals, wheel hood and attaching flange, although preferably a casting may be made up in other ways as by welding to produce an integer attachable to and removable from the side flooring as such.

What is claimed is:

1. In a mine car, a central longitudinally extending floor, opposite side sections extending laterally outward therefrom, each side section comprising a riser, side flooring and side wall, each side flooring having spaced wheel openings adjacent the riser, a plurality of integral wheel frames each comprising, inner and outer pedestal portions for reception of an axle, a wheel hood adapted to extend upwardly through and substantially close a wheel opening, a flange adapted to engage the under surface of the car side flooring adjacent the ends and outer side of the wheel opening, and a pair of spaced vertical ribs extending outwardly from the outer pedestal portion beneath the adjacent side wall constituting a pair of side wall supporting elements, and means attaching the wheel frames to the side flooring.

2. In a mine car, a central longitudinally extending floor, opposite side sections extending laterally outward therefrom, each side section comprising a riser, side wall and side flooring, the latter having spaced wheel openings therein adjacent the riser, a plurality of integral wheel frames each comprising, inner and outer pedestal portions for the reception of a wheel and axle assembly, a wheel hood adapted to extend upwardly through and substantially close a wheel opening, means adjacent the periphery of the wheel opening adapted to engage the under surface of the car side flooring to support the same, and spaced vertical ribs extending outwardly from the outer pedestal portion beneath the adjacent side wall and constituting spaced apart side wall supporting elements, and means attaching the wheel frames to the side flooring.

3. In a mine car, a central longitudinally extending floor, opposite side sections extending laterally outward therefrom, each side section comprising a riser, side flooring, and side wall, each side flooring having spaced wheel openings between the riser and side wall; a plurality of independent integral wheel frames each comprising, inner and outer pedestal portions for reception of a wheel and axle assembly, a wheel hood adapted to extend upwardly through and substantially close a wheel opening, ears merging with the wheel hood and extending laterally from the inner pedestal portion for attachment to the adjacent riser, a pair of spaced vertical ribs extending outwardly from the outer pedestal portion beneath the side flooring and beyond the side wall for supporting the floor and side wall, a flange adapted to engage the under surface of the car side flooring adjacent the ends and outer side of the wheel opening, means attaching the wheel frames to the car, and a wheel and axle assembly carried by the pedestal portions and projecting into the wheel hoods.

4. An integral wheel frame for mine cars comprising, inner and outer pedestal portions for reception of a wheel and axle assembly, a wheel hood extending upwardly from the pedestal portions, a flange for attachment to the car floor, laterally extending vertical flanges extending from each side of the inner pedestal portion and merging with a wall of the wheel hood, and a pair of vertically extending spaced apart side wall supporting ribs projecting outwardly from either side of the outer pedestal portion and having their upper surfaces substantially flush with the upper surfaces of said pedestal portions and said flange.

5. An integral wheel frame for mine cars, comprising, inner and outer pedestal portions for reception of a wheel and axle assembly, a wheel hood merging with the pedestal portions, spaced apart substantially right angular bracing elements extending outwardly from either side of the outer pedestal portion to support the car side wall, and flanges formed on the ends of the hood and merging with the bracing elements to provide a substantially uniplanar support for the car floor.

VICTOR WILLOUGHBY.